United States Patent [19]

Pomara, Jr.

[11] 3,757,676

[45] Sept. 11, 1973

[54] FOOD PROCESSING APPARATUS

[75] Inventor: Johnny B. Pomara, Jr., Dallas, Tex.

[73] Assignee: El Chico Corporation, Dallas, Tex.; a part interest

[22] Filed: Dec. 7, 1970

[21] Appl. No.: 95,708

[52] U.S. Cl. ............................. 99/450.6, 99/450.7
[51] Int. Cl. ............................................. A21c 9/06
[58] Field of Search .................... 107/1 A, 1 R, 1 B, 107/27, 28, 29, 52, 54 R, 54 D, 4 E; 18/4 B; 99/450.6, 450.7

[56] References Cited
UNITED STATES PATENTS

| | | | |
|---|---|---|---|
| 2,960,045 | 11/1960 | Pentzlin | 107/1 A X |
| 3,532,510 | 10/1970 | Zimmerman | 107/54 D |
| 2,923,257 | 2/1960 | Monaco | 107/29 R |
| 2,905,105 | 9/1959 | Lombi | 107/1 A |
| 2,855,867 | 10/1958 | Zeitlin | 107/1 A |

FOREIGN PATENTS OR APPLICATIONS

641,676   8/1950   Great Britain ........................ 107/1 A

Primary Examiner—William I. Price
Assistant Examiner—Alan I. Cantor
Attorney—H. Mathews Garland

[57] ABSTRACT

A food processsing machine particularly adapted to the rapid preparation of food items including Mexican food products such as enchiladas and tacos. The machine has a feed conveyor, a filler dispenser, and a folding belt for forming a bread, cake, or pastry type shell into an envelope around a food filler. One form of the apparatus also includes a sealing system associated with the folding belt for sealing the shell around the filler after folding by the belt. The shells are sequentially introduced into the machine on the feed conveyor where a measured quantity of filler, such as a meat paste, is deposited on each shell. The shell moves along the folding belt to a folding region where it is folded upwardly around the filler and sealed forming a filler enclosing envelope over a major central portion of the shell as the food product so prepared is advanced toward the discharge end of the belt. Various embodiments disclosed adapt the machine to processing different size food products of the nature described.

19 Claims, 17 Drawing Figures

INVENTOR
Johnny B. Pomara, Jr.

BY H. Mathews Garland
ATTORNEY

FOOD PROCESSING APPARATUS

This invention relates to food processing apparatus and more particularly relates to apparatus for the preparation of a food product comprising an inner filler within a folded envelope of a substantially flat bread, cake, or pastry type shell.

In the past, the preparation of food items, particularly of the nature of Mexican food products such as enchiladas and tacos, has been largely a slow, hand operation producing a product somewhat characterized by inconsistent or uneven appearance and to some degree, not necessary consistent in other quality and quantity characteristics. The advent of frozen, prepared foods and particularly prepared complete frozen dinners makes highly desirable a system for the production of large quantities of such food products at a rapid rate and with repeatable consistency of quantity, physical appearance, and the like. Accordingly, it is a principal object of this invention to provide a machine which automatically prepares filled food products such as Mexican tacos and Mexican enchiladas at a rapid rate with consistent quality and a minimum of hand work.

It is another object of the invention to provide apparatus of the character described which includes a folding conveyor belt for forming a filler containing envelope in a flat cake, bread, or pastry type food shell.

It is another object of the invention to provide apparatus of the character described which includes a dispensing valve for sequentially depositing measured quantities of a flowable food product filler on a plurality of substantially flat food shells.

It is another object of the invention to provide apparatus of the character described which seals the food filler within the shell after folding around the food filler.

It is another object of the invention to provide a food processing machine of the character described which may be utilized in either single or multiple row fashion for producing large quantities of food products at a rapid rate.

It is another object of the invention to provide a food processing machine of the character described which is adapted to processing both individual food items introduced sequentially into the system and a continuous stream or ribbon of a food product which is cut into selected length upon discharge from the system.

In accordance with these and further objects of the invention which will be apparent from the detailed description of preferred embodiments thereof, there is provided a food processing machine which includes a product folding conveyor belt having an input end and a discharge end and a product folding portion or region between such ends for folding a substantially flat cake, bread, or pastry shell into an envelope for containing a food filler. The folding portion of the flexible conveyor belt is guided into a U-shaped folding shape by a pair of laterally spaced guide rollers disposed on opposite sides of the upper product conveying section of the belt. A feed conveyor is positioned at the input end of the folding belt conveyor. A filler dispensing valve is secured over the feed conveyor for depositing a measured quantity of food filler on each shell moved along the feed conveyor. The product shells are sequentially introduced into the system from a suitable source such as the cooling belt at the discharge end of an oven. As the shells each enter the machine, measured quantities of a food filler, such as a meat paste, are deposited on each of the shells. The shells then move along the folding belt conveyor on which they are folded into a U-shape forming a filler containing envelope. In one form of the machine, the envelope is then sealed around the filler and each product is discharged from the folding belt for packaging.

Preferred forms of the apparatus together with objects and advantages of the invention will be better understood by the following detailed description taken in conjunction with the accompanying drawings wherein.

Figures 1, 3, 5, 6, 17:
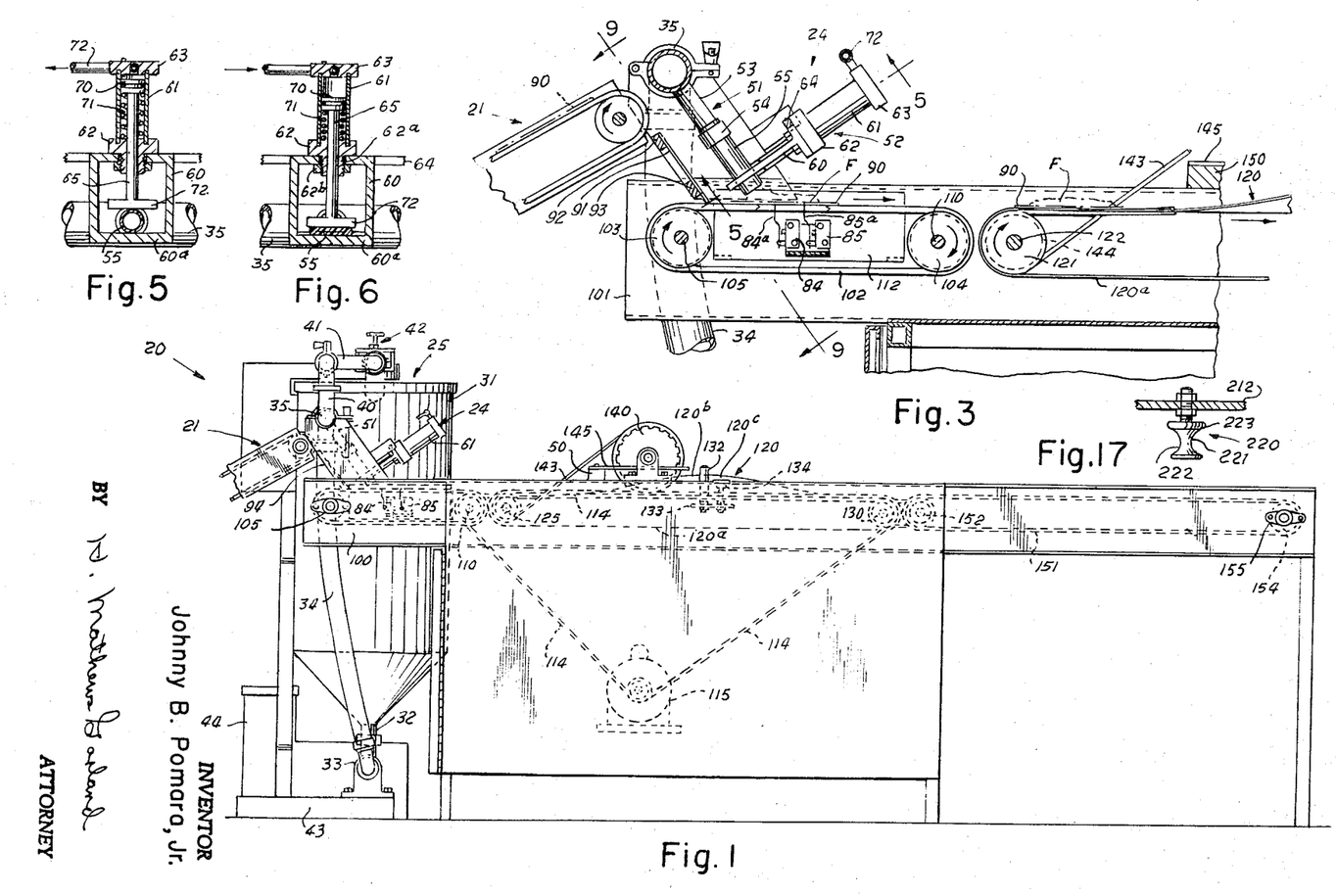
FIG. 1 is a side view in elevation of one embodiment of a food processing machine constructed in accordance with the invention.
FIG. 3 is an enlarged fragmentary side view taken along the line 3—3 of FIG. 2 showing, particularly, the filler dispenser manifold and valve system.
FIG. 5 is a fragmentary view in section along the line 5—5 of FIG. 3 showing the dispensing valve open for depositing filler on one of the shells.
FIG. 6 is a view similar to FIG. 5 showing the dispensing valve closed.
FIG. 17 is a side view in elevation of a form of combined folding belt guide and shell seal roller.
Figures 2, 4, 7, 8:
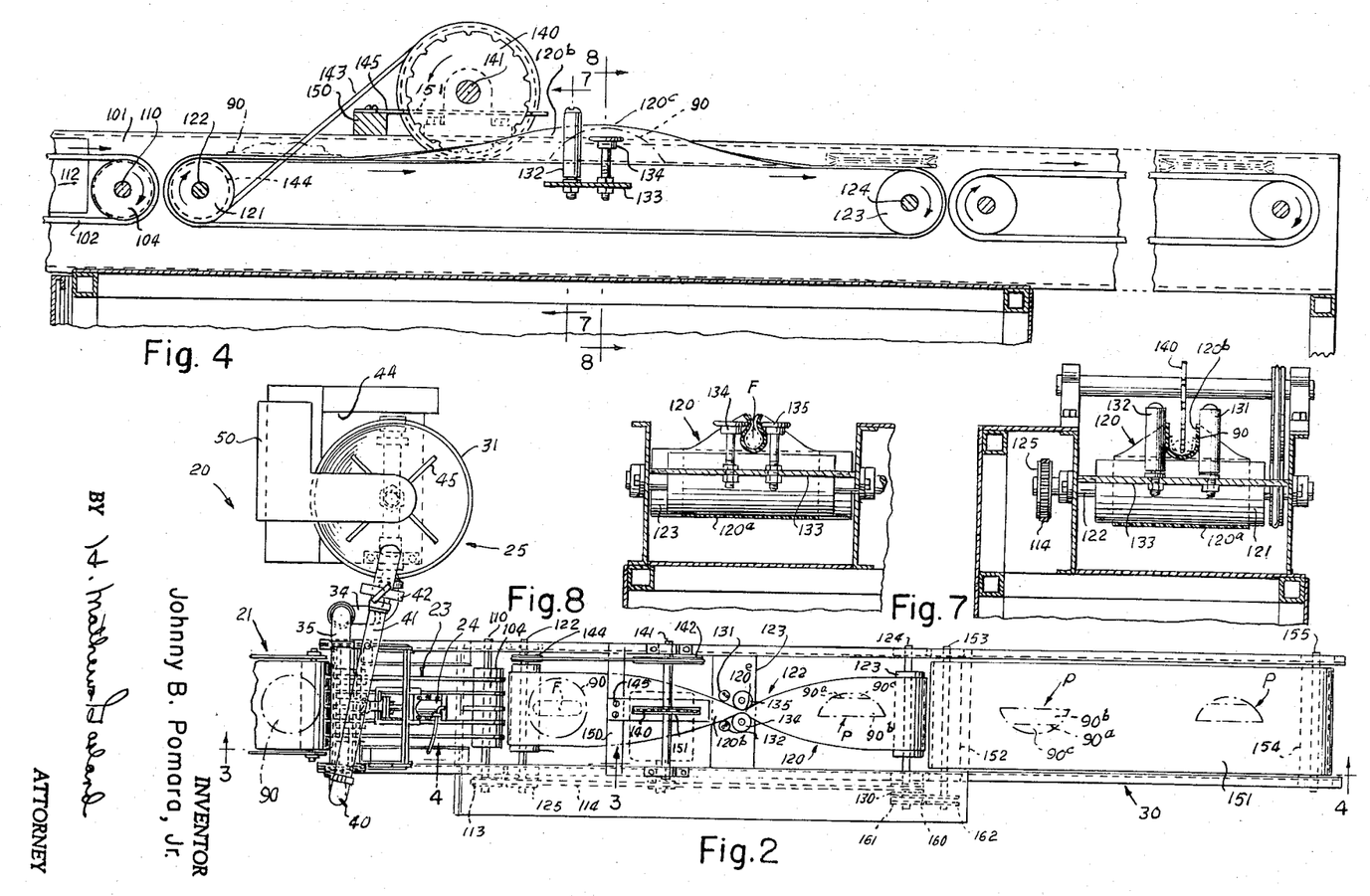
FIG. 2 is a top view in elevation of the food processing machine of FIG. 1.
FIG. 4 is an enlarged fragmentary side view in section along the line 4—4 of FIG. 2.
FIG. 7 is a view in section along the line 7—7 of FIG. 4 showing a folding belt guide roller, a seal roller, and the hold-down roller of the machine.
FIG. 8 is a view in section along the line 8—8 of FIG. 4 showing the shell seal rollers operating with the folding belt.

Referring to the drawings, particularly FIGS. 1 and 2, a food processing machine 20 embodying the invention is shown at the discharge end of a conveyor 21 which may be from an oven, not shown, a cooling conveyor or any other suitable form of transfer conveyor for supplying shells to the food processing machine. The food processing machine 20 broadly includes a folding belt conveyor 22, a feed conveyor 23, and a filler dispensing system 24. A suitable filler supply system 25 is connected with the dispensing system for providing a constant flow of filler. A take-away conveyor 30 is connected at the discharge end of the folding belt for transporting prepared products to a suitable packaging station, not shown.

The filler supply system 25 includes a reservoir tank 31 connected at its lower end 32 to the intake of a pump 33 which discharges to a filler supply line 34. The supply line 34 is connected at its upper end to a manifold 35 which connects through a U-shaped pipe fitting 40 to a recirculating line 41 which discharges back into the upper open end of the reservoir 31. The line 41 is provided with a back pressure valve 42 for controlling pressure in the manifold. The pump 33 is supported on a base 43 and is connected by suitable means, not shown, to a drive system 44. A multiple-bladed agitator or stirrer 45 is supported in the reservoir tank from a suitable housed drive system 50 for continuous mixing of a filler, such as meat paste, in the reservoir tank.

The dispensing valve 24 is connected with the manifold 35, FIG. 3, and includes a discharge nozzle 51 connected directly into the manifold and a valve operator cylinder 52. The discharge nozzle has a rigid tubular portion 53 secured directly into the manifold 35 at an upper end and connected at a lower end by a sleeve 54, to a flexible discharge tube 55, which is preferably a form of plastic deformable from a full open shape, FIG. 5, to a pinched closed configuration, FIG. 6. The nozzle discharge tube 55 also must be a material which is capable of being maintained in a sanitary condition for purposes of handling food products. The lower end portion of the tube 55 is disposed through a harness 60 supported from the cylinder assembly 52. The cylinder assembly 52 includes a cylinder 61 secured at one end to a base 62 and at the other end to a head 63. The base has a threaded portion 62a disposed through an opening in the harness 60. A nut 62b on the threaded portion 62a holds the harness 60 on the cylinder base 62. The harness is connected as shown in FIG. 3 to a cross member 64 for supporting the cylinder assembly at the proper position and angle above the feed conveyor 23. The cylinder assembly has a piston rod 65 connected with a piston 70 which is biased upwardly by a spring 71 confined in the cylinder between the base 62 and the piston. The free end of the piston rod 65 slidably extends through the base 62 supporting a pincher head 72 which reciprocates with the rod toward and away from a harness cross member 60a for controlling flow through the flexible discharge tube 55. At the retracted position of the pincher head 72, FIG. 5, the tube 55 is fully open to allow maximum flow from the manifold 35 through the nozzle to a shell on the feed conveyor. At the extended piston rod position of FIG. 6, the head 72 tightly squeezes the discharge nozzle tube 55 against the harness member 60a completely closing off all discharge flow through the nozzle. The cylinder head 63 is connected by an air line 73, FIG. 11, to a suitable air supply, not shown, for extending the piston to pinch off flow through the discharge nozzle as shown in FIG. 6. The air line 72 also functions as a return discharge or exhaust line when the air pressure is relieved and the spring lifts the piston back to the position of FIG. 5 to reopen the discharge nozzle.

The air supply and discharge line 73 to the cylinder assembly 24 is connected through a three-way valve 73 having a three-way T-shaped valve passage 74 which communicates with an air supply line 75 at one position and a discharge line 80 at another position. Any suitable air supply, not shown, providing a constant air pressure of the desired value is satisfactory. The valve 73 is actuated by a suitable valve operator 81 connected with a time delay relay 82. One conductor 83 from the time delay relay is connected through a pair of micro switches 84 and 85 to a power source, not shown. The switches 84 and 85 have feelers 84a and 85a, respectively, which are contacted by a shell on the feed conveyor 23 as the shell is moved from the input to the discharge end of the conveyor. The other lead 86 from the time delay relay is connected directly to the power source. The switch 84 is a normally open switch while the switch 85 is normally closed so that a shell 90 moving along the conveyor 23 initially engages and closes the switch 84, which, by virtue of the normally closed switch 85, energizes the time delay relay. The valve 73 is normally positioned to communicate the air supply with the cylinder 61 so that air pressure in the cylinder holds the piston rod 65 extended pinching the discharge nozzle tube 55 closed. When the time delay is energized the valve operator 81 moves the valve 73 to a position to discharge air from the cylinder to the atmosphere through the line 72, the valve, and the line 80 permitting the spring 71 to retract the piston rod so that the discharge nozzle 51 is opened for discharge of filler F through the nozzle to a shell as represented in FIG. 3. As the shell moves along the conveyor 23, it engages the normally closed switch 85 opening the switch thereby cutting off power to the time delay relay. The close proximity of the feelers 84a and 85a of the switch provides for a short power pulse to the time delay relay. The delay time in the relay is adjusted to keep the valve 73 at the air discharge position for just the proper length of time that deposit of filler on the shell is desired. As the shell passes, the time delay relay causes the valve 73 to move from a normal air-on position at which the filler dispensing nozzle is closed to an air-off position for discharge of air from the cylinder and resultant opening of the dispensing nozzle for long enough to deposit the desired amount of filler on the shell and then return the valve to the air-on position for again shutting off the dispensing nozzle.

During operation of the machine, the filler, such as a meat paste, in the system 25 is constantly pumped through the supply line 34 from the lower end of the tank 31 by the pump 33. The filler moves through the manifold 35 and the back-pressure valve 42 back into the tank 31. The back pressure is adjusted by the valve 42 to maintain a sufficient pressure in the manifold 35 that when the filler dispensing nozzle 55 from the manifold is opened with the pincher head 72 at the position of FIG. 5, the desired quantity of filler material is discharged through the nozzle onto the moving tortilla.

At the input end of the machine a plurality of guide wires 91 are secured in parallel laterally spaced relation between an upper cross member 92 and a lower cross member 93 connected between end brackets 94 and 95 to form an input wire slide for directing each shell 90 from the discharge end of the conveyor 21 to the input conveyor 34. The brackets 94 and 95 are connected to side panels 100 and 101 of the main frame of the machine.

The feed conveyor 23 comprises a plurality of laterally spaced belts 102 which run on longitudinally spaced end rollers 103 and 104. The roller 103 is mounted on a bearing supported shaft 105 connected between the side panels 100 and 101. Similarly, the end roller 104 is mounted on shaft 110 secured between the side panels of the frame. A pair of side guides 111 and 112 are mounted inwardly of the side panels 101 along opposite sides of the conveyor belts 102 to aid in guiding shells 90 along the belt beneath the dispensing nozzle 51. A drive gear 113 on the shaft 110 of the feed conveyor 23 is engaged by a chain or belt 114 driven by a motor 115 for turning the roller 104 to drive the feed conveyor 23.

A flexible shell folding belt conveyor 120 is supported between an end roller 121 on a shaft 122 and an end roller 123 on a shaft 124. The shafts are suitably mounted on bearings not shown, in the frame side panels 100 and 101. The belt 120 is aligned with the conveyor 23. The input end of the belt 120 is closely spaced from the output end of the conveyor 23. The shaft 122 has a drive gear 125, on the end of the shaft extending through the side panel 101 and aligned with the drive gear 113 on the conveyor 23 so that the drive chain 114 runs over both the drive gears 113 and 125. Similarly, the other shaft 124 of the folding belt has a drive gear 130 over which the drive chain 114 runs whereby both end rollers 121 and 123 of the folding belt are driven at the same rate and synchronized with the driving of the feed conveyor 23. The lower folding belt portion 120a runs straight between the end rollers 121 and 123 while the upper portion of the belt has a central folding region 120b and a short sealing region 120c. It will be apparent that the folding and sealing regions are not fixed physical characteristics of the belt which is a constantly moving member but rather are controlled deformations in the belt as it moves past the pair of vertical, elongated, laterally spaced folding rollers 131 and 132 supported from a cross brace 133 between the machine frame side panels 100 and 101, and a pair of seal rollers 134 and 135 also supported from the cross member 133. The folding rollers are disposed on opposite sides of the folding belt to guide the belt to a U-shaped folding configuration as particularly evident in FIG. 7. The seal rollers squeeze opposite portions of each shell together after the filler is folded into it, as described hereinafter.

A serrated hold-down wheel 140 is supported aligned in a vertical plane along the longitudinal center line of the folding belt spaced from the folding rollers toward the input end of the belt. The hold-down wheel is mounted on a shaft 141 secured at opposite ends to bearings supported on the side panels 100 and 101. The lower edge of the hold-down wheel is supported in close spaced relation above the normal plane of the flat portions of the top portion of the folding belt as best seen in FIG. 4. A drive wheel 142 mounted on the shaft 141 is driven by a twisted belt 143 running over a pulley 144 on the shaft 122 of the folding roller 121. The belt is twisted as evident in FIG. 4 for the lower edge of the hold-down wheel 140 to move in the same direction as the top portion of the folding belt 120. The hold-down wheel must rotate counterclockwise whereas its driving pulley is rotating in a clockwise direction. Since the shaft 122 on which the pulley 144 is mounted also is the shaft supporting the end roller 121 of the folding belt, and such shaft is driven by the chain 114, the rotation of the hold-down wheel is synchronized with the movement of the folding belt. Since the hold-down wheel keeps the product shell downwardly in the folding belt as the shell is folded upwardly, it is desirable that the lower peripheral edge of the wheel move at the same rate as the top surface of the folding belt. A scraper 145 is mounted around the hold-down wheel on a cross bar 150 between the side panels of the machine frame. The lower portion of the hold-down wheel 140 is disposed through a longitudinal slot 151 in the scraper with the slot being sized to form a fairly close tolerance fit between the side and peripheral edges of the wheel 140 below the shaft 141. The scraper keeps the wheel reasonably clean and free of the product filler as the wheel, in performing its funtion, revolves along and through the longitudinal center line of the deposit of filler on each product shell.

The discharge conveyor 30, aligned with and at the discharge end of the folding belt, includes a belt 151 mounted on one end roller 152 supported on a shaft 153 and another end roller 154 supported on a shaft 155. The shafts 153 and 155 are mounted with suitable bearings, not shown, at the machine frame side panels 100 and 101. The conveyor is driven by a belt 160 running on a driving pulley 161 on the shaft 124 of the folding belt and a driven pulley 162 on the shaft 153 of the conveyor roller 152. Since the driving chain 114 runs directly over the pulley 130 on the shaft 124, the discharge conveyor is thus directly synchronized with the rate of movement of the folding belt.

Figures 9, 10, 11, 12, 13, 14, 15, 16:
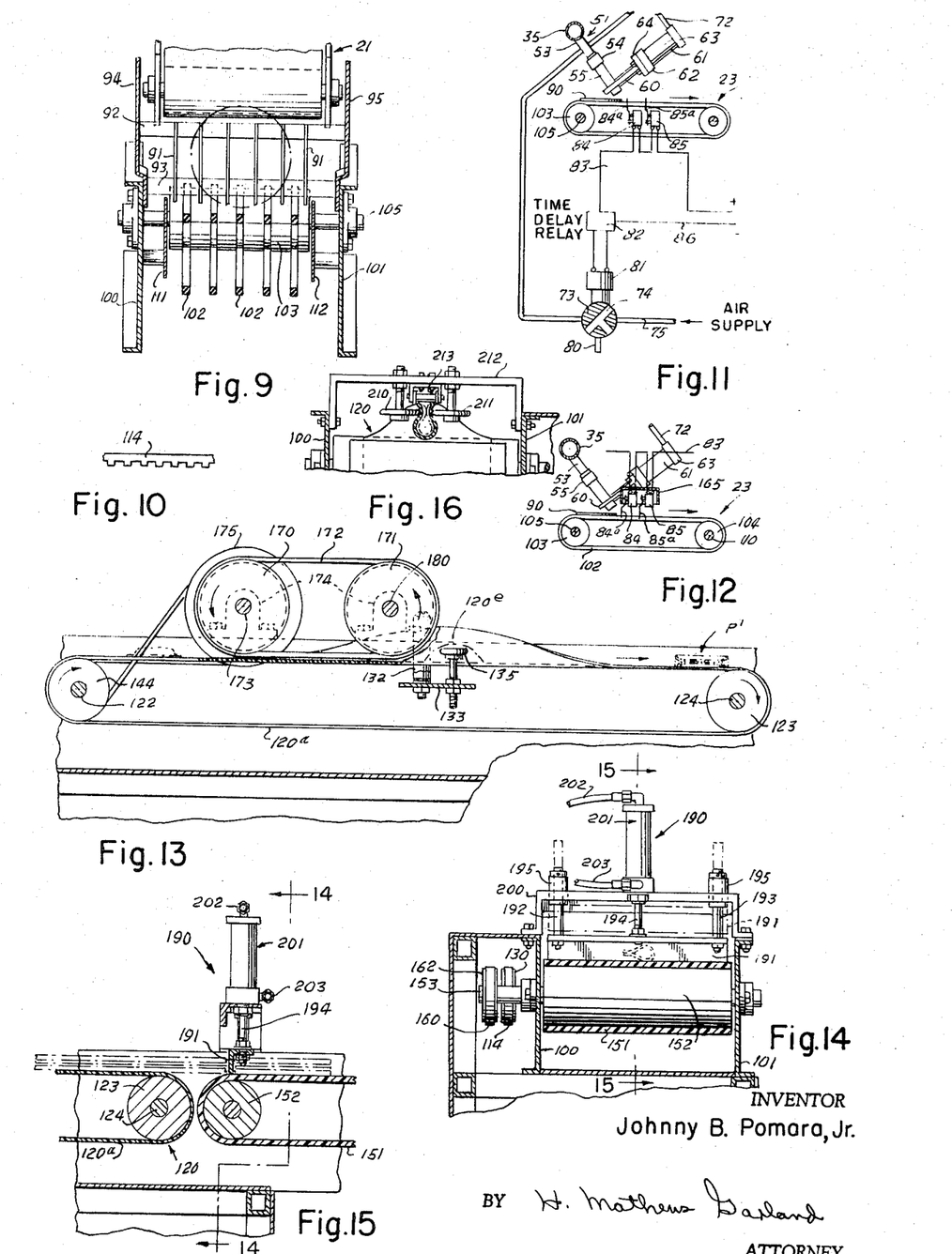
FIG. 9 is a view in section along the line 9—9 of FIG. 3 showing the discharge end of a cooling conveyor, the input wire slide, and the input end of the feed conveyor of the machine.
FIG. 10 is a fragmentary side view in elevation of the timing chain or belt of the main drive and timing system of the machine.
FIG. 11 is a schematic diagram of the filler dispensing system including the air supply control and timing circuitry.
FIG. 12 is a schematic fragmentary view of an alternate arrangement of timing control switches for the system shown in FIG. 11.
FIG. 13 is a fragmentary side view, partly in section, of an alternate arrangement of the hold-down apparatus for preparation of smaller food products than can be handled with the system of FIGS. 1 and 2.
FIG. 14 is a fragmentary view in section along the line 14—14 of FIG. 15 of a cutting system for use with the machine of FIGS. 1 and 2 when a continuous ribbon-like product is being processed.
FIG. 15 is a fragmentary side view, partially in section, taken along the line 15—15 of FIG. 14.
FIG. 16 is a fragmentary view in section of an alternate form of belt guide and sealing roller apparatus used with the folding belt, taken substantially along the same line as represented by 8—8 in FIG. 4.

FIG. 12 shows an alternate arrangement for support of the actuating switches 84 and 85 in those instances where the filler material dispensed by the valve system 24 is subject to spillage on the machine structure and requires washdown periodically which particularly subjects the switches to possible water damage. The switches 84 and 85 are hung above the conveyor belt 23 from a suitable cross-brace, not shown, and are covered by a hood 165 to protect the switches when water or other cleaning liquids are directed on the machine. The switch sensors 84a and 85a are positioned between the conveyor belts 102 and function identically as in the system of FIG. 11. The other features of the timing and dispensing system used with the switch arrangement of FIG. 12 are as shown in FIG. 11. It will be recognized that a single switch of suitable design may be employed to discharge the functions of the on and off switches 84 and 85 to sense the movement of the product shell 90 for actuating the valve system 24 over the desired length of time to deposit filler on the shell.

FIG. 13 illustrates a modified form of the hold-down wheel system which may be employed in lieu of the serrated hold-down wheel 140 in the preparation of a substantially smaller food product, such as a party size taco or enchilada. A pair spaced hold-down pulleys 170 and 171 are aligned along the longitudinal axis of the folding belt. A hold-down belt 172 runs over the pulleys 170 and 171. The belt 172 is a round plastic belt which will readily withstand the immersion in food products, will remain sanitary, and can be effectively cleaned and maintained. The hold-down pulley 170 is supported on a transverse shaft 173 mounted between end bearings 174 supported at opposite ends of the shaft on the side panels 100 and 101 of the machine frame. A pulley 175 is secured on the shaft 173 between the folding belt edge and the side panel 101 for driving the hold-down pulleys 170 and 171 with the interconnected hold-down belt 172. The pulley 174 is driven by a twisted belt 175 which runs over the pulley 144, previously referred to, mounted on the shaft 122 and driven by the chain 114 to synchronize all of the rotating components of the machine. The hold-down pulley 171 is mounted on a shaft 180 which similarly is supported on another pair of bearings 174 at opposite ends of the shaft mounted on the side panels 100 and 101. Both of the hold-down pulleys are vertically positioned and aligned to permit the lower portion of the hold-down belt 172 running between the lower edges of the pulleys to be spaced slightly above the normal top plane surface of the folding belt 120 along its longitudinal center line. The pulley 170 is longitudinally positioned relative to the hold-down belt at a location in advance of or before the belt edges start folding upwardly while the hold-down pulley 171 is well in the fold of the belt. The positioning of the hold-down pulleys and the belt 172 is dictated by the need to hold a small product shell down in the folding belt from a time just prior to entry into the folding portion of the belt 120 and until the shell is fully folded and about to pass between the seal rollers 135. A small product, such as a party taco or enchilada, is much more readily processed with this form of hold-down system due to a tendency for the product to deviate from the proper position in the folding belt as it moves into the fold and is sealed.

FIGS. 14 and 15 illustrate a knife assembly 190 which may be installed on the processing machine of FIGS. 1 and 2, or its modified form as represented in FIG. 13, where a continuous ribbon-like product is processed. The knife assembly cuts the product into selected lengths. A transverse knife blade 191 is supported across the input end of the discharge conveyor 30 by a pair of supporting guide rods 192 and 193 and a centrally positioned piston rod 194. Each of the guide rods moves in a sleeve bearing 195 secured through a transverse bracket 200 supported on the machine frame side panels 100 and 101. The piston rod 194 is part of a piston assembly 201 of a double acting type having air supplied at opposite ends by supply hoses 202 and 203 extending from a suitable air supply. The dual action feature of the piston unit, as supplied by the air hoses 202 and 203 which function alternately as supply and exhaust hoses, permits positive action raising and lowering of the knife blade 191 between the lower solid line position and upper broken line position of FIG. 14. The lines 202 and 203 extend through suitable valving and timing mechanism, not shown, similar to that of FIG. 11, for actuating the knife at selected time intervals to provide the desired lengths of the ribbon-like product being processed by the system. Obviously, with such an arrangement the timing system must operate the dispensing nozzle 51 on a continuous basis so long as the strip-like product shell is fed into the machine on the input conveyor 23.

Alternate forms of folding belt guides and product sealing rollers are represented in FIGS. 16 and 17. Referring to FIG. 16 a pair of sealing wheels 210 and 211 are supported from a transverse bracket 212 which extends across and over the folding belt from the side panels 100 and 101. The sealing rollers 210 and 211 function identically as rollers 134 and 135 shown in FIG. 2, the principal distinction being that the rollers in FIG. 16 are supported from above the belt as distinguished from the lower support of the rollers in FIG. 2. A hold-down inverted U-shaped belt guide roller 213 is supported above and between the sealing rollers on the lower face of the bracket 212. The slot through the roller 213 receives the adjacent edge portions of the folding belt for holding the belt downwardly as it slides along and between the sealing rollers. FIG. 17 illustrates one of a pair of identical top supported combined belt folding roller and sealing roller 220 which may be supported from the transverse bracket 212 to perform the combined functions of the folding belt guide rollers 131 and 132 and the sealing rollers 134 and 135. The roller 220 has the folding belt guide portion 221 which has a concave surface 222 and a lip or flange-like sealing portion 223. The concave roller portion guides the folding belt into the folded relationship represented in FIG. 16 and somewhat resembling the belt shape of FIGS. 7 and 8, while the lip portion 223 seals the product shell as it passes within the folding belt between the rollers. The shape of the opening between a pair of the rollers 220 defined by the concave roller portions 222 is somewhat like a teardrop.

In operation, the machine 20 of FIGS. 1–11 functions to prepare a taco, enchilada, or similar type food product having an outer foldable, edible shell and an inner filling. The machine receives the shell, deposits a measured amount of filler, such as a meat paste, on the shell, folds the shell to form a filler-containing envelope, seals the envelope, and discharges the finished product. The shells 90, which may be freshly cooked tortillas, are deposited in the machine by the conveyor 21 which discharges the shells on the slide wires 91 between the discharge end of the conveyor 21 and the small input feed conveyor 23. The shells slide down the wires 91 onto the belts 102 of the feed conveyor. The leading edge of each shell 90 engages the sensor 84a of the switch 84 closing the circuit to the time delay relay controlling the air valve 73. Since the switch 85 is a normally closed switch, the closing of the switch 84 energizes the time delay relay moving the switch 73 to a position to exhaust air from the piston 61 through the line 72, the valve 73 and the exhaust nozzle 80. The spring 71 of the piston assembly 52 lifts the piston rod 65 and the pincher head 72 to the position of FIG. 5 at which it is spaced from the end member 60a of the harness 60. The constantly recirculating pressure of the meat paste or filler in the manifold 35 of the filler system 25 forces discharge of meat filler F through the flexible hose portion 55 of the dispensing nozzle 51 onto the top face of the shell 90. As the shell advances along the conveyor 23, its forward edge engages the sensor 85a of the switch 85 a very short time after having engaged sensor 84a of the switch 84. The switch 85, a normally closed switch, is opened shutting off power to the time delay relay. The cooperative action of the switches 84 and 85 thus send an electrical pulse to the time delay relay which actuates the relay through an operating cycle, the time length of which is determined by adjustment of the time delay feature of the relay. The relay is adjusted to allow the dispensing nozzle to be open just long enough for filler to be deposited across the full diameter of the shell 90. Responsive to the setting of the time delay relay, the valve 73 is moved back to a position to supply air to the piston unit 52 to extend the piston rod 65 again pinching off or closing the flexible tube portion 55 of the discharge nozzle shutting off the supply of filler being deposited on the shell 90. When the discharge nozzle is closed, the filler material continues to circulate in the system 25 returning to the reservoir 31.

The shell 90 on which the filler F has been deposited, FIG. 3, is advanced by the conveyor 23 and discharged at the end of the conveyor to the input end of the folding belt 120. The close proximity of the discharge end of the conveyor 23 and the input end of the belt 20, with a certain degree of rigidity of the shell 90 and the filler F thereon, permits ready transfer of the shell and filler to the folding belt. FIG. 2 shows the filler F deposited across a shell 90 on the input end of the folding belt. The shell and filler move along the folding belt into contact with the lower edge of the hold-down wheel 140 which tends to engage the shell 90 with its serrated edge. The wheel revolves in a counterclockwise direction, as seen in FIG. 1, so that the lower edge of the wheel moves along and at the same rate of speed as the folding belt surface. The lower edge of the wheel rotates through the filler F, holding the central portion of the shell 90 downwardly against the top face of the folding belt as the belt folds the lateral edges of the shell upwardly toward each other as the belt is guided by the folding rollers 131 and 132. FIG. 7 shows a shell 90 with the filler F spread across it moving along the folding portion 120b of the folding belt at the hold-down wheel 140. Any filler material, such as the meat paste, sticking to the hold-down wheel is cleaned from the wheel and deflected back downwardly by the scraper 145. The shell and filler advances into the most fully folded portion of the folding belt, as shown in FIG. 8, between the seal rollers 134 and 135 which squeeze the shell together along a straight seal line slightly above the ribbon of filler on the shell, sealing the shell along a line 90a, thereby forming a filler-filled envelope portion 90b and a small arcuate flap portion 90c which may be folded over against the envelope portion when packing the finished product P.

The folding and sealing functions are performed in essentially the same way by the alternate forms of the apparatus of FIGS. 16 and 17. Looking at the form of FIG. 16 as the filled shell moves along the folding portion of the belt, the guide roller 213 holds the belt down while the seal rollers 210 and 211 seal the shell along the line 90a to contain the filler within the envelope 90b. If the machine is equipped with the rollers 220 of FIG. 17, the principal folding function of the belt and the sealing of the shell around the filler is accomplished more simultaneously as the product moves in the belt between the spaced rollers. The end product is essentially the same in each of the forms of folding and sealing apparatus which might be employed in the machine.

The operation of the modified form of apparatus shown in FIG. 13 is generally identical to that already described, the principal difference residing in the use of the dual hold-down pulleys and hold-down belt to facilitate handling of a smaller shell and filler quantity which requires slightly increased hold-down time during folding. In processing the larger enchiladas and tacos as previously discussed, the shell 90 is generally about six inches in diameter while the smaller shells used for the party sizes, which may function as hors d'oerves and the like, may have a shell 90' on the order of three inches in diameter. Obviously, the timing system of FIG. 11 must be adjusted to deposit a smaller quantity or shorter ribbon of filler across the shell. As the shell moves along the folding belt, it is first engaged by the hold-down belt 172 along the lower edge of the first hold-down pulley 170. The length of the belt 172 between the lower edges of the hold-down pulleys 170 and 171 holds the center of the shell and filler against the top surface of the belt at the bottom of the valley defined by the upwardly folding belt edges. The folding belt and hold-down belt 172 advances the shell and filler as the shell is folded around the filler into the deep folded portion of the belt where the seal rollers then seal the shell around the filler. The belt then discharges it as the product P' shown at the discharge end of the folding belt in FIG. 13.

When the machine is used with the knife assembly of FIGS. 14 and 15, a continuous ribbon of a shell strip about the same width as the diameter of the shells 90 or 90' is fed into the input end of the machine at the conveyor 23 beneath the filler discharge nozzle 51, which is adjusted to deposit a continuous ribbon of filler along the shell strip. The filler and shell strip move through the folding and sealing section of the belt, being discharged as a continuous product strip formed in cross section to appear the same as the tacos and enchiladas previously described. The knife assembly is adjusted to cut the product strip in selected lengths as desired.

The machine may be constructed for single row production or multiple row production. In multiple row use a plurality of the machines may be simply aligned in parallel side by side relationship or the functional components of the system, as for example the filler dispensing nozzle assemblies, the folding belts, and the related structure such as the hold-down wheels, fold guides, and seal rollers, are provided for each production row desired. In such a combination a single filler manifold may be used from the filler reservoir tank to supply each of the dispensing nozzles, each nozzle being independently timed and functioning responsive to the feed of product shells into the machine along that particular row. A single discharge conveyor belt also may be used with the output of each of the folding belts delivering the completed product to the belt. The machine is capable of an exceptionally high production rate, as for example, each row of a combination machine formed by several production lines, is capable of processing several hundred products per minute.

While the apparatus of the invention has been described in terms principally of its application to the preparation of Mexican food products, such as enchiladas and tacos, it will be readily recognized that the machine is readily applicable to other products which are prepared by folding a relatively thin outer shell of cake, bread, pastry or similar mass, around an inner filler. Under certain circumstances controlled by product shell content, temperature, and the like, the shell hold-down means may not be required to retain the shell and filler in the folding region of the folding belt, though under most conditions such hold-down means is preferred.

What is claimed and desired to be secured by Letters Patent is:

1. Apparatus for preparing a food product having an outer shell folded around an inner filler comprising: a folding belt conveyor; a pair of spaced end rollers supporting said folding belt; filler dispensing means for depositing said filler on said shell at said input end of said folding belt; means engaging said folding belt intermediate said input end of said belt and a discharge end of said belt for folding the lateral edges of said belt upwardly and inwardly into closely spaced lateral relationship deforming said belt in lateral cross section to a generally U-shaped configuration for folding said shell upwardly around said filler as said shell and filler advance along said belt through the deformed region of said belt to the discharge end thereof; and hold-down guide means supported along said folding belt within the deformed portion of said belt as said belt enters said means for folding said belt to hold said shell and filler downwardly in said belt as said shell and filler enter said folding region of said belt.

2. Apparatus in accordance with claim 1 wherein said hold-down means comprises a wheel supported for rotation above said folding belt, the lower peripheral edge of said wheel being disposed in close spaced relation with the top surface of said folding belt substantially along the longitudinal center line of said belt.

3. Apparatus in accordance with claim 2 wherein said hold-down wheel is driven at a rate synchronized with the rate of movement of said folding belt.

4. Apparatus in accordance with claim 1 wherein said hold-down means comprises a pair of longitudinally spaced pulleys supported above said folding belt, one of said pulleys having a lower peripheral portion disposed in the folding region of said belt and the other of said pulleys being located in advance of the folding region of said belt, said pulleys being aligned in a common vertical plane substantially along the longitudinal center line of said folding belt, and a hold-down belt running on said pulleys, the lower segment of said belt between said pulleys being disposed substantially along the longitudinal center line of said folding belt along the top surface of said folding belt for engaging and holding a product shell and filler as said shell and filler enter the folding region of said folding belt.

5. Apparatus in accordance with claim 4 wherein said hold-down pulleys and hold-down belt are driven at a rate synchronized with the rate of movement of said folding belt.

6. Apparatus in accordance with claim 1 including a timing system for actuating said filler dispensing means at a predetermined timed sequence for sequentially depositing filler along spaced product shells sequentially fed into said apparatus.

7. Apparatus in accordance with claim 1 including sealing means supported in operative relationship with the folding region of said folding belt for sealing said shell around said filler.

8. Apparatus for preparing a food product having an outer shell folded around an inner filler comprising: a feed conveyor for receiving said shell at one end thereof and discharging said shell at an opposite end thereof; a dispensing nozzle assembly supported above said feed conveyor for depositing a quantity of said filler on said shell as said shell is moved relative to said nozzle assembly by said feed conveyor; control means connected with said nozzle assembly for operating said assembly for deposit of a measured quantity of said filler on said shell including sensing means for detecting the movement of the said shell along said feed conveyor relative to said nozzle assembly; a folding belt conveyor disposed in shell receiving relationship with said feed conveyor whereby said shell and filler are discharged by said feed conveyor to an input end of said folding belt conveyor; guide means engaging lateral side portions of said folding belt conveyor intermediate the input and discharge ends of said conveyor for deforming a folding portion of said folding belt conveyor into a substantially U-shape wherein lateral edges of said belt are guided upwardly and inwardly toward each other to a closely spaced adjacent relationship above the bight portion of said belt along said folding region whereby as said shell with said filler thereon moves through said folding region, said shell is folded around said filler forming an envelope portion of said shell containing said filler, said product thereafter being transported by said folding conveyor belt to a discharge end of said belt; and hold-down guide means supported in operative relation with said folding belt conveyor within said folding region of said belt between said input end of said belt and said guide means for deforming said belt, said hold-down guide means having a product engaging portion for holding said shell and filler within said folding region of said belt as said shell is folded upwardly around said filler; and means for driving said feed conveyor and said folding belt conveyor at synchronized rates.

9. Apparatus in accordance with claim 8 including shell sealing means supported in operative relationship with said folding region of said folding belt conveyor for squeezing said shell together to seal said shell defining an envelope in said shell containing said filler.

10. Apparatus in accordance with claim 9 wherein said sealing means comprises roller means formed integral with said means engaging said folding belt conveyor and guiding said belt into said folding configuration along said folding region of said belt.

11. Apparatus in accordance with claim 8 wherein said hold-down means comprises a hold-down wheel supported above said folding belt conveyor along the entry portion of the folding region of said belt, said wheel having a lower peripheral edge running substantially along the longitudinal center line of said folding belt in the direction of movement of said folding belt; and means driving said hold-down wheel at a rate synchronized with the rate of movement of said folding belt.

12. Apparatus in accordance with claim 8 wherein said dispensing nozzle comprises a length of flexible tubing adapted to be supplied with said filler material under a dispensing pressure, and a piston assembly having a pinching head thereon co-acting with said flexible tubing for pinching said tubing together in a closed relationship and for releasing said tubing for expansion and dispensing of filler therethrough to a surface of said shell as said shell is moved relative to said dispensing nozzle.

13. Apparatus for preparing a food product having an outer shell folded around an inner filler comprising: a feed conveyor including end rollers and spaced belt members running over said rollers for receiving and moving said shell from an input to a discharge end of said conveyor while said filler is deposited on said shell; a dispensing nozzle supported above said feed conveyor for depositing said filler material on said shell as said shell is moved relative to said nozzle by said feed conveyor; sensor means supported relative to said feed conveyor for engagement by said shell as said shell is moved along said conveyor relative to said nozzle; timing circuit means connected between said nozzle and said sensor means for actuating said nozzle responsive to movement of said shell relative to said detecting means for depositing a measured quantity of said filler on said shell as said shell is moved by said feed conveyor; a folding belt conveyor positioned with an input end at the discharge end of said feed conveyor for receiving said shell with said filler thereon from said discharge end of said feed conveyor, said folding belt conveyor including end rollers and a flexible belt operated over said end rollers; folding belt guide means disposed along opposite sides of said folding belt conveyor between said end rollers of said conveyor engaging lateral side edges of said folding belt conveyor deflecting said side edges upwardly and inwardly deforming said belt into a substantially U cross-sectional shape along a folding region of said folding belt conveyor whereby said shell with said filler thereon, upon entry into and movement through said folding belt region, is folded upwardly around said filler and moved to and discharged from the discharge end of said belt; hold-down means supported in operative relation with said folding belt conveyor including at least one wheel member supported in a substantially vertical plane along the longitudinal axis of said folding belt conveyor having a lower peripheral region disposed along the entry portion of said folding region of said folding belt conveyor for holding said shell downwardly as said shell and filler enter said folding region; drive means for turning said wheel member in a direction for moving the lower peripheral edge of said member in the same direction as said folding belt conveyor at said member; and drive means connected with said feed conveyor and said folding belt conveyor for driving said conveyors at a synchronized rate.

14. Apparatus in accordance with claim 13 wherein said dispensing nozzle includes a flexible tubular outlet portion and a piston-actuated pincher head co-acting with said flexible outlet portion for squeezing said portion together to close said dispensing nozzle at a first head position and for releasing said outlet portion for expansion to a full open shape at a second head position for dispensing said filler through said outlet portion to said shell on said feed conveyor.

15. Apparatus in accordance with claim 13 including shell seal means disposed along opposite side portions of said folding belt conveyor between said hold-down means and said discharge end of said conveyor for squeezing said shell together to seal said shell around said filler defining an envelope formed by said shell containing said filler.

16. Apparatus in accordance with claim 15 wherein said sensor means includes at least one switch connected in said timing circuit means and having a feeler for engaging said shell to actuate said timing circuit means for operating said dispensing nozzle to deposit a desired quantity of said filler on said shell.

17. Apparatus in accordance with claim 13 including knife means positioned adjacent to the discharge end of said folding belt conveyor for cutting a ribbon-like product in selected lengths as said product is discharged by said conveyor belt.

18. A dispensing nozzle system for depositing a measured quantity of a flowable material on a surface comprising: a conduit member adapted to be connected at one end to a source of said flowable material under pressure and adapted at the opposite end to discharge of said flowable material on said surface, at least a portion of said conduit being of a flexible material expandable and contractable between a normally open shape for flow of said flowable material therethrough and a squeezed together, closed shape for preventing flow of any of said material therethrough; a member providing a holding surface on one side of said flexible portion of said conduit for holding said conduit against movement while said conduit is squeezed closed; a piston assembly operative responsive to a fluid pressure and having a piston rod extendable and retractable relative to said flexible portion of said conduit; and a pincher head on said piston rod for engaging said flexible portion of said conduit opposite said holding surface whereby extension of said piston rod and pincher head toward said holding surface squeezes said flexible portion of said conduit together to close said conduit against movement of said flowable material, and retraction of said piston rod away from said holding surface permits expansion of said flexible portion of said conduit to a full open shape for flow of said material through said conduit for deposit on said surface.

19. Apparatus for processing food products having an outer shell and an inner filler comprising: a feed conveyor having longitudinally spaced end rollers and laterally spaced conveyor belts running over said end rollers, said feed conveyor being adapted to sequentially receive said food product shells for movement from an input end of said conveyor to an output end thereof; a dispensing nozzle assembly secured above said feed conveyor for depositing a measured quantity of said filler on each of said shells as said shells are moved along said feed conveyor; a filler supply system connected with said dispensing nozzle for supplying said nozzle with a filler under pressure; a sensor member supported with a shell engaging portion penetrating the carrying plane of the belts on said feed conveyor for engagement by each of said shells as said shells are moved along said conveyor; a timing and power circuit interconnected between said dispensing nozzle and said sensor member for operating said nozzle responsive to said sensor for depositing predetermined quantities of said filler on each of said shells; a folding belt conveyor supported in alignment with said feed conveyor, said folding belt conveyor including longitudinally spaced end rollers and a flexible belt running over said rollers, an input end of said folding belt conveyor being positioned at the discharge end of said feed conveyor; guide means secured on opposite sides of said flexible belt between said input and discharge ends engaging lateral edge portions of said belt deforming said edge portions upwardly and inwardly providing a folding region along said belt to fold lateral portions of said shells upwardly around said filler in each of said shells forming an envelope of each of said shells around the said filler as each of said shells with said filler thereon is moved through said folding region of said belt toward the discharge end thereof; hold-down means secured above said flexible belt of said folding belt conveyor along the folding region thereof having a shell engaging portion disposed within the entry portion of said folding region of said belt for holding each of said shells downwardly in said belt as said shell enters the folding region of said belt; and means for driving said hold-down means at a rate synchronized with the rate of movement of said feed conveyor and said folding belt conveyor.

* * * * *